United States Patent
Sun et al.

(10) Patent No.: US 12,283,029 B2
(45) Date of Patent: Apr. 22, 2025

(54) IMAGE INPAINTING METHOD AND ELECTRONIC DEVICE

(71) Applicants: BOE TECHNOLOGY GROUP CO., LTD., Beijing (CN); Peking University, Beijing (CN)

(72) Inventors: Yan Sun, Beijing (CN); Yunhe Tong, Beijing (CN); Tiankuo Shi, Beijing (CN); Xue Chen, Beijing (CN); Yanhui Xi, Beijing (CN); Yuxin Bi, Beijing (CN); Anjie Wang, Beijing (CN); Songchao Tan, Beijing (CN); Xiaomang Zhang, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 332 days.

(21) Appl. No.: 17/907,849

(22) PCT Filed: Mar. 12, 2021

(86) PCT No.: PCT/CN2021/080464
§ 371 (c)(1),
(2) Date: Aug. 29, 2022

(87) PCT Pub. No.: WO2021/180204
PCT Pub. Date: Sep. 16, 2021

(65) Prior Publication Data
US 2023/0125649 A1    Apr. 27, 2023

(30) Foreign Application Priority Data

Mar. 12, 2020 (CN) .......................... 202010169599.7

(51) Int. Cl.
*G06T 5/77* (2024.01)
*G06T 7/11* (2017.01)
(Continued)

(52) U.S. Cl.
CPC .................. *G06T 5/77* (2024.01); *G06T 7/11* (2017.01); *G06T 7/40* (2013.01); *G06T 7/50* (2017.01); *G06V 10/761* (2022.01)

(58) Field of Classification Search
CPC ..... G06T 5/77; G06T 7/50; G06T 7/11; G06T 7/40; G06V 10/761
See application file for complete search history.

(56) References Cited

U.S. PATENT DOCUMENTS

2019/0392632 A1    12/2019 Han et al.

FOREIGN PATENT DOCUMENTS

| CN | 103209334 A | 7/2013 |
| CN | 104240275 A | 12/2014 |

(Continued)

OTHER PUBLICATIONS

Zhu, Linwei, Yun Zhang, Mei Yu, Gangyi Jiang, and Sam Kwong. "View-spatial-temporal post-refinement for view synthesis in 3D video systems." Signal Processing: Image Communication 28, No. 10 (2013): 1342-1357. (Year: 2013).*

(Continued)

*Primary Examiner* — David Perlman
(74) *Attorney, Agent, or Firm* — XSENSUS LLP

(57) ABSTRACT

An image inpainting method includes: acquiring an image to be inpainted based on depth information and texture information of a reference image, the image to be inpainted including at least one region to be inpainted; determining at least one reference block matching the at least one region to be inpainted respectively in the reference image; and inpainting the at least one region to be inpainted by using the at least one reference block to obtain a composite image.

13 Claims, 4 Drawing Sheets

(51) Int. Cl.
G06T 7/40 (2017.01)
G06T 7/50 (2017.01)
G06V 10/74 (2022.01)

(56) References Cited

FOREIGN PATENT DOCUMENTS

| CN | 104837000 A | 8/2015 |
| CN | 106485672 A | 3/2017 |
| CN | 106791773 A | 5/2017 |
| CN | 108648221 A | 10/2018 |
| CN | 111311521 A | 6/2020 |

OTHER PUBLICATIONS

First Office Action for Chinese Patent Application No. 202010169599.7 issued by the Chinese Patent Office on Aug. 16, 2021.
Second Office Action for Chinese Patent Application No. 202010169599.7 issued by the Chinese Patent Office on Mar. 28, 2022.
Third Office Action for Chinese Patent Application No. 202010169599.7 issued by the Chinese Patent Office on Jun. 3, 2022.
Decision of Rejection for Chinese Patent Application No. 202010169599.7 issued by the Chinese Patent Office on Aug. 30, 2022.

* cited by examiner

| 32 | 64 | 128 |
|----|----|-----|
| 16 |    | 1   |
| 8  | 4  | 2   |

(a)

(b)

IMAGE INPAINTING METHOD AND ELECTRONIC DEVICE

CROSS-REFERENCE TO RELATED APPLICATIONS

This application is a national phase entry under 35 USC 371 of International Patent Application No. PCT/CN2021/080464, filed on Mar. 12, 2021, which claims priority to Chinese Patent Application No. 202010169599.7, filed on Mar. 12, 2020, which are incorporated herein by reference in their entirety.

TECHNICAL FIELD

The present disclosure relates to the field of image processing technologies, and in particular, to an image inpainting method, an electronic device and a non-transitory computer-readable storage medium.

BACKGROUND

With the development of display technology and people's demand for new display technology, 3 dimensional (3D) display technology has been widely concerned and applied. The basic principle of the 3D display technology is to make viewers produce a stereoscopic visual effect through parallax. In the process of viewing 3D display content, the viewers observe different images with parallax in their left and right eyes, and process the different images observed by their left and right eyes in their brain, so as to obtain stereoscopic information containing depth of field.

SUMMARY

In a first aspect of the present disclosure, an image inpainting method is provided, and the image inpainting method includes:
  acquiring an image to be inpainted based on both depth information and texture information of a reference image, the image to be inpainted including at least one region to be inpainted;
  determining at least one reference block matching the at least one region to be inpainted respectively in the reference image; and
  inpainting the at least one region to be inpainted according to the at least one reference block respectively to acquire a composite image.

Further, acquiring the image to be inpainted based on both the depth information and the texture information of the reference image includes:
  synthesizing the image to be inpainted, based on a depth-image-based rendering (DIBR) algorithm, according to both the depth information and the texture information of the reference image.

Further, each region to be inpainted includes at least one pixel point to be inpainted with a pixel value of zero; determining the at least one reference block matching the at least one region to be inpainted respectively in the reference image includes:
  determining priorities of all pixel point to be inpainted in a region to be inpainted;
  acquiring a target pixel point with a highest priority in all the pixel points to be inpainted, and acquiring a first preset region in the region to be inpainted with the target pixel point as a center; and
  matching the first preset region with regions of the reference image, and using a region of the reference image that matches the first preset region as a reference block.

Further, matching the first preset region with the regions of the reference image, and using the region of the reference image that matches the first preset region as the reference block includes:
  acquiring a first reference pixel point corresponding to the target pixel point in the reference image, and acquiring a second preset region of the reference image with the first reference pixel point as a center;
  determining a first offset matrix according to the first preset region and the second preset region;
  acquiring, for all second reference pixel points in the reference image, third preset regions of the reference image each with a second reference pixel point as a center; the second reference pixel point being any pixel point in the reference image;
  determining a second offset matrix according to the first preset region and each third preset region;
  determining an offset factor according to the first offset matrix and the second offset matrix;
  acquiring a grayscale similarity factor between the second reference pixel point and the target pixel point;
  determining a similarity between the first preset region and the third preset region according to the offset factor and the grayscale similarity factor; and
  among the third preset regions determined according to all the second reference pixel points, using a preset region with a smallest similarity as the reference block.

Further, determining the priorities of all the pixel points to be inpainted in the region to be inpainted includes:
  acquiring, for each pixel point to be inpainted in the region to be inpainted, a structure factor of the pixel point to be inpainted according to both a unit normal vector and a gradient value of the pixel point to be inpainted;
  determining a direction factor of the pixel point to be inpainted according to the pixel point to be inpainted and neighborhood pixel points adjacent to the pixel point to be inpainted; and
  determining a priority of the pixel point to be inpainted according to the structure factor and the direction factor.

Further, determining the priorities of all the pixel points to be inpainted in the region to be inpainted includes:
  setting priorities of a part of pixel points to be inpainted at edge positions of the region to be inpainted to be low; and
  setting priorities of another part of pixel points to be inpainted at center positions of the region to be inpainted to be high.

Further, after acquiring the at least one region to be inpainted of the image to be inpainted, and before determining the priorities of all the pixel points to be inpainted in the region to be inpainted, the method further includes:
  acquiring a plurality of pixel points in the region to be inpainted;
  acquiring, for each pixel point of the plurality of pixel points, neighborhood pixel points of each pixel point;
  if a number of pixel points not belong to the region to be inpainted in the neighborhood pixel points of each pixel point is greater than a preset threshold, inpainting the pixel point according to the pixel points not belong to the region to be inpainted; and determining at least one pixel point not inpainted in the plurality of pixel points as the at least one pixel point to be inpainted.

Further, the at least one region to be inpainted includes a plurality of regions to be inpainted, and the at least one reference block includes a plurality of reference blocks. Inpainting the at least one region to be inpainted according to the at least one reference block respectively to acquire the composite image, includes:
inpainting the plurality of regions to be inpainted sequentially according to the plurality of reference blocks respectively to acquire the composite image; or
inpainting the plurality of regions to be inpainted in parallel according to the plurality of reference blocks respectively to acquire the composite image.

In a third aspect of the present disclosure, an electronic device is provided. The electronic device includes: a memory, a processor and a computer program that is stored on the memory and run on the processor. The computer program, when executed by the processor, implements:
acquiring an image to be inpainted based on both depth information and texture information of a reference image, the image to be inpainted including at least one region to be inpainted;
determining at least one reference block matching the at least one region to be inpainted respectively in the reference image; and
inpainting the at least one region to be inpainted according to the at least one reference block respectively to acquire a composite image.

Further, the computer program, when executed by the processor, further implements:
synthesizing the image to be inpainted, based on a depth-image-based rendering (DIBR) algorithm, according to both the depth information and the texture information of the reference image.

Further, each region to be inpainted includes at least one pixel point to be inpainted with a pixel value of zero; the computer program, when executed by the processor, further implements:
determining priorities of all pixel points to be inpainted in a region to be inpainted;
acquiring a target pixel point with a highest priority in all the pixel points to be inpainted;
acquiring a first preset region in the region to be inpainted with the target pixel point as a center; and
matching the first preset region with regions of the reference image, and using a region of the reference image that matches the first preset region as a reference block.

Further, the computer program, when executed by the processor, further implements:
acquiring a first reference pixel point corresponding to the target pixel point in the reference image;
acquiring a second preset region of the reference image with the first reference pixel point as a center;
determining a first offset matrix according to the first preset region and the second preset region;
acquiring, for all second reference pixel points in the reference image, third preset regions of the reference image each with a second reference pixel point as a center; the second reference pixel point being any pixel point in the reference image;
determining a second offset matrix according to the first preset region and each third preset region;
determining an offset factor according to the first offset matrix and the second offset matrix;
acquiring a grayscale similarity factor between the second reference pixel point and the target pixel point;
determining a similarity between the first preset region and the third preset region according to the offset factor and the grayscale similarity factor; and
among the third preset regions determined according to all the second reference pixel points, using a preset region with a smallest similarity as the reference block.

Further, the computer program, when executed by the processor, further implements:
acquiring, for each pixel point to be inpainted in the region to be inpainted, a structure factor of the pixel point to be inpainted according to both a unit normal vector and a gradient value of the pixel point to be inpainted;
determining a direction factor of the pixel point to be inpainted according to the pixel point to be inpainted and neighborhood pixel points adjacent to the pixel point to be inpainted; and
determining a priority of the pixel point to be inpainted according to the structure factor and the direction factor.

Further, the computer program, when executed by the processor, further implements:
setting priorities of a part of pixel points to be inpainted at edge positions of the region to be inpainted to be low; and
setting priorities of another part of pixel points to be inpainted at center positions of the region to be inpainted to be high.

Further, after acquiring the at least one region to be inpainted of the image to be inpainted, and before determining the priorities of all the pixel points to be inpainted in the region to be inpainted, the computer program, when executed by the processor, further implements:
acquiring a plurality of pixel points in the region to be inpainted;
acquiring, for each pixel point of the plurality of pixel points, neighborhood pixel points of each pixel point;
if a number of pixel points not belonging to the region to be inpainted in the neighborhood pixel points of each pixel point is greater than a preset threshold, inpainting the pixel point according to the pixel points not belonging to the region to be inpainted; and
determining at least one pixel point not inpainted in the plurality of pixel points as the at least one pixel point to be inpainted.

Further, the at least one region to be inpainted includes a plurality of regions to be inpainted, and the at least one reference block includes a plurality of reference blocks. The computer program, when executed by the processor, further implements:
inpainting the plurality of regions to be inpainted sequentially according to the plurality of reference blocks respectively to acquire the composite image; or
inpainting the plurality of regions to be inpainted in parallel according to the plurality of reference blocks respectively to acquire the composite image.

In a fourth aspect of the present disclosure, a computer-readable storage medium is further provided. The computer-readable storage medium has stored a computer program thereon. The computer program, when executed by the processor, implements the steps in the image inpainting method provided by embodiments of the present disclosure.

DETAILED DESCRIPTION

Figures 1, 2:
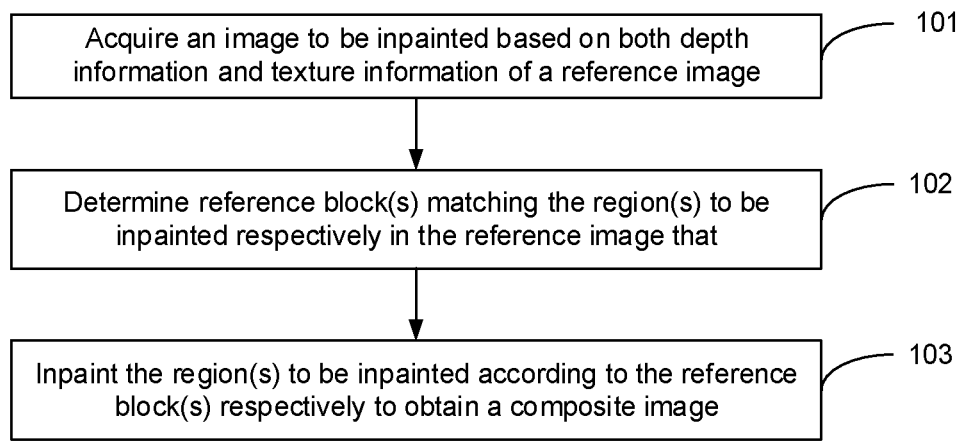
FIG. 1 is a flow diagram of an image inpainting method, in accordance with embodiments of the present disclosure.
FIG. 2 is a schematic diagram of a calculation template, in accordance with embodiments of the present disclosure.

In order to make technical problems to be solved, technical solutions and advantages in the present disclosure clear, the following will be described in detail with the accompanying drawings and specific embodiments.

The most common way to obtain stereoscopic images currently is to wear 3 dimensional (3D) glasses. However, viewers do not need to wear additional devices due to the glasses-free 3D display technology, which is the mainstream direction of the 3D display technology in the future. The glasses-free 3D display technology has problems of few observation viewpoints and discontinuous viewpoints.

In response to the above problems, researchers have proposed a multi-viewpoints glasses-free 3D technology. This technology utilizes prisms to generate an image with multiple viewpoints, and the viewers can see the stereoscopic image at different positions. However, this technology has a problem of the acquisition of the image with multiple viewpoints. For example, if a camera is used for capturing images, eight cameras are required for capturing at the same time for eight viewpoints 3D display. The increase in the number of cameras causes an increase in shooting cost, and the calibration of different cameras is also a problem.

Generating an image with virtual viewpoints based on an image captured by one camera has advantages of saving cost and few data transmission. In the related art, a depth-image-based rendering (DIBR) technology is simple in calculation and high in efficiency, and is the most important multi-viewpoints synthesis technology in the current glasses-free 3D technology.

The DIBR technology is helpful to solve the problem of data acquisition in the glasses-free 3D display technology. However, a large number of image holes (a pixel value at the hole is 0) will be formed in the viewpoint synthesized by the method, thereby greatly affecting the display quality of image and the viewing effect.

For small holes in the synthetic image, an interpolation method such as mean filtering or median filtering is generally used for inpainting. But for a hole with a large area, the interpolation method will cause the image to be blurred and distorted. In the related art, a method for inpainting the holes with large areas based on the best sample has been proposed, such as the Criminisi algorithm (proposed by Antonio Criminisi in 2004, Region Filling and Object Removal by Exemplar-Based Image Inpainting). This method searches for a sample matching region and copies it, and proposes calculating the priority of inpainting block in a target inpainted region, so that a filling order only depends on the image itself. However, the Criminisi algorithm needs to calculate the priority (i.e., the first position to be inpainted) every time, and needs to traverse the whole image for calculation when searching for a matching block, so the computation is huge.

The solution of the present disclosure is optimized on a basis of the above, and provides an algorithm for rapidly inpainting holes, which may quickly and effectively inpaint the holes, improve an image quality of synthetic viewpoint, and improve the display quality.

Referring to FIG. 1, FIG. 1 is a flow diagram of an image inpainting method provided by the embodiments of the present disclosure. The embodiments provide an image inpainting method, which is applied to an electronic device and includes the following steps.

Figure 7:
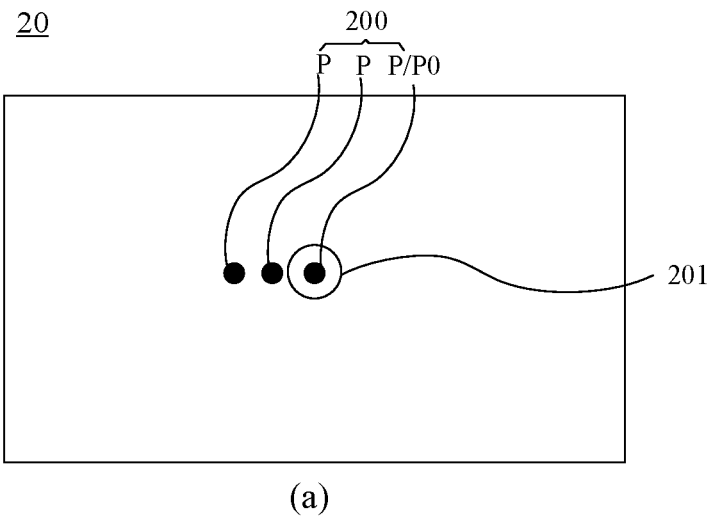
FIG. 7 is a schematic diagram of an image to be inpainted and a reference image, in accordance with embodiments of the present disclosure.
Figure 7:
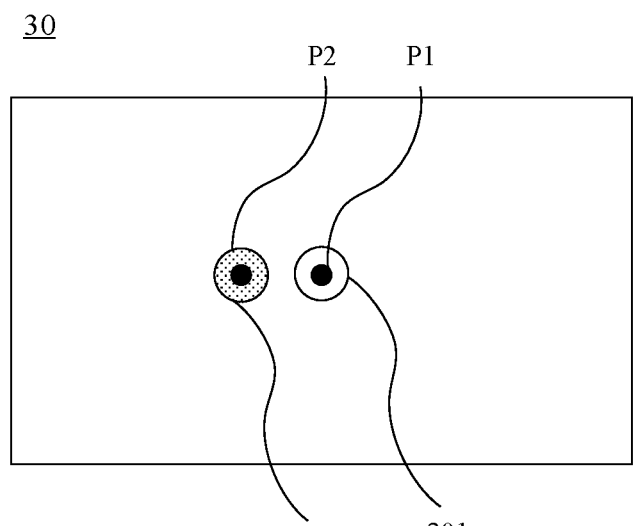

In step 101, as shown in FIG. 7, an image to be inpainted 20 is acquired based on both depth information and texture information of a reference image 30, the image to be inpainted 20 includes region(s) to be inpainted 200, and the region to be inpainted 200 includes at least one pixel point to be inpainted P with a pixel value of zero.

The image to be inpainted is obtained by synthesis according to both the depth information and the texture information of the reference image. For example, based on the DIBR algorithm, the image to be inpainted may be obtained according to both the depth information and the texture information of the reference image. The image to be inpainted will form holes due to block and other factors, and a pixel value of a hole region is 0. It is known that a texture map I of a reference viewpoint (which may be interpreted as the reference image) and a depth map D of the reference viewpoint, a synthetic viewpoint to be inpainted I' may be obtained, where p(i, j) is a pixel point of I'. The region to be inpainted $I_{mask}'$ is determined to be:

$$I_{mask}' = \cup_{p(i,j) \in I'} p(i,j) = 0.$$

The synthetic viewpoint to be inpainted is the image to be inpainted, and "∪" represents a union of sets.

In step 102, as shown in FIG. 7, reference block(s) 300 matching the region(s) to be inpainted 200 respectively in the reference image 30 are determined.

The reference image includes the depth map and the texture map, the depth map includes the depth information, and the texture map includes the texture information. In this step, the reference block matching the region to be inpainted may be searched for in the texture map of the reference image. The region(s) to be inpainted may include one or more regions. If the region(s) to be inpainted include multiple regions, the reference blocks that match the multiple regions respectively are searched for in the reference image.

In step 103, as shown in FIG. 7, the reference block(s) 300 are used to inpaint the region(s) to be inpainted 200 respectively to obtain a composite image.

The region to be inpainted is inpainted using the reference block that matches the region to be inpainted in the reference image. For example, pixel point(s) in the reference block are used to fill pixel point(s) in the region to be inpainted, so as to obtain a final composite image. If the region(s) to be inpainted include multiple regions, a reference block matching a respective region may be used to inpaint the corresponding region. Since there is no relation between the multiple regions, the multiple regions may be inpainted sequentially. For example, the multiple regions may be numbered, so that the multiple regions may be inpainted sequentially according to the numbers. Of course, the multiple regions may be inpainted in parallel according to the actual operation conditions, which is not limited here.

The reference image has complete texture information. Therefore, the region to be inpainted in the image to be inpainted is filled with pixel points in the matched reference block found in the reference image, so that the synthesis effect of the composite image may be improved.

In the embodiments of the present disclosure, the image to be inpainted is acquired based on the depth information and the texture information of the reference image, the image to be inpainted includes the region(s) to be inpainted, and the region(s) to be inpainted each includes at least one pixel point to be inpainted with a pixel value of zero. The reference block(s) matching the region(s) to be inpainted respectively in the reference image are determined. The reference block(s) are used to inpaint the region(s) to be inpainted respectively to obtain the composite image. Since the reference image has complete texture information, by filling the region to be inpainted in the image to be inpainted with the pixel points in the matched reference block found in the reference image, the synthesis effect of the composite image may be improved.

In the embodiments of the present disclosure, in step 102, determining the reference block(s) that matches the region(s) to be inpainted respectively in the reference image includes:

as shown in FIG. 7, determining priorities of all pixel points to be inpainted P in the region to be inpainted 200;

acquiring a target pixel point P0 with the highest priority in all the pixel points to be inpainted, and acquiring a first preset region 201 in the region to be inpainted with the target pixel point P0 as a center; and matching the first preset region 201 with regions of the reference image 30, and using a region of the reference image 30 that matches the first preset region 201 as the reference block 300.

In the embodiments, the method of determining the priorities of all the pixel points to be inpainted in the region to be inpainted may be selected flexibly. For example, priorities of pixel points at the edge positions of the region to be inpainted are set to be low, and priorities of pixel points at the center positions of the region to be inpainted are set to be high. In the embodiments, the following method for determining the priorities of all the pixel points to be inpainted in the region to be inpainted is provided, and the method includes:

acquiring, for each pixel point to be inpainted in the region to be inpainted, a structure factor of the pixel point to be inpainted according to both a unit normal vector and a gradient value of the pixel point to be inpainted; determining a direction factor of the pixel point to be inpainted according to the pixel point to be inpainted and neighborhood pixel points adjacent to the pixel point to be inpainted; and determining the priority of the pixel point to be inpainted according to the structure factor and the direction factor.

For example, the data factor may be expressed as:

$$D(p) = \frac{|\nabla I_p^T \cdot n_p|}{\alpha}.$$

Where $n_p$ is the unit normal vector of the pixel point to be inpainted in the region to be inpainted; $\nabla I_p$ is the gradient value (vector) of the pixel point to be inpainted, and rotating $\nabla I_p$ by 90° is $\nabla I_p^T$, which is a direction of the isophote line; and $\alpha$ is the normalization term. For an 8-bit image, $\alpha$ is 255.

The data factor contains structural information, and the data factor is also called the structure factor.

According to a positional relationship between the synthetic viewpoint (which may be understood as the image to be inpainted) and the reference viewpoint (which may be understood as the reference image), it may be determined in which direction the hole (which may be understood as the region to be inpainted) appears of the object. In addition, considering that the hole is formed due to different offsets between the foreground object and the background object when the viewpoint are synthesized and mapped, theoretically, only a situation that the foreground object obscures the background object will occur, and the hole should be filled using background data. In an example where a left viewpoint is mapped to synthesize a right viewpoint, the hole will appear on the right side of the object, so the inpainting from the right side of the hole to the left side thereof will get a good effect.

Figure 3:
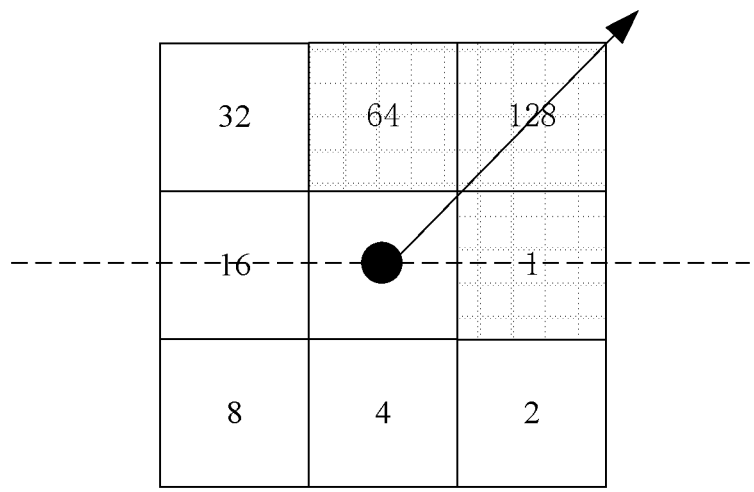
FIG. 3 is a schematic diagram of calculation of an inpainting angle, in accordance with embodiments of the present disclosure.

FIG. 2 is a calculation template, and the numbers in the figure are template coefficients. FIG. 3 is a schematic diagram of calculation of an inpainting angle. As shown in FIG. 3, the center point in FIG. 3 is the pixel point to be inpainted, eight neighborhood pixel points of the center point are given weights according to the template coefficients in the calculation template, and then 256 situations of the neighborhood of the pixel point to be inpainted may be represented. In FIG. 3, pixel points filled by grid lines represent valid pixel points in the neighborhood, and pixel points filled in white represent pixel points of holes in the neighborhood. The inpainting direction of the pixel point to be inpainted is 45 degrees, an angle of the inpainting direction is within (−180, 180], and the inpainting angle A may be obtained by summing coefficients at the hole position.

For the pixel point to be inpainted p(i, j), A is the inpainting direction, the synthetic viewpoint is at the right side of the reference viewpoint, and a formula for calculating the direction factor of the synthetic viewpoint is:

$$Dir(p) = \frac{180° - |A|}{180°}$$

If the synthetic viewpoint is at the left side of the reference viewpoint, a formula for calculating the direction factor of the synthetic viewpoint is:

$$Dir(p) = \frac{|A|}{180°}$$

Finally, after comprehensive consideration, the priority of the pixel point to be inpainted p(i, j) is calculated as:

Priority$(p) = w_d * D(p) + w_{dir} * Dir(p)$.

For each pixel point to be inpainted in the region to be inpainted, both the structure factor and the direction factor are obtained in the above manner, and the priority of the pixel point to be inpainted is determined according to the structure factor and the direction factor.

Where $w_d$ and $w_{dir}$ are respectively weights of the structure factor and the direction factor. The above calculation is performed for each pixel point to be inpainted in a same hole, and then the pixel point with the highest priority in the hole is selected as the target pixel point.

After the target pixel point is determined, the first preset region in the region to be inpainted with the target pixel point as the center is acquired. The first preset region may be a square region of (K+1)×(K+1), and a value of K may be set according to the actual situation. For example, K is 2.

After the first preset region is determined, the first preset region is matched with the texture map of the reference image, and a region of the texture map that matches the first preset region is used as the reference block.

In the embodiments, the first preset region in the region to be inpainted is determined first, and then the reference block that matches the first preset region is found in the reference image. As a result, it may be convenient to use the reference block to inpaint the region to be inpainted subsequently, so as to obtain the composite image. Since the reference image has complete texture information, the first preset region in the image to be inpainted is filled with pixel points in the matched reference block found in the reference image, so that the synthesis effect of the composite image may be improved.

In the embodiments of the present disclosure, after acquiring the region(s) to be inpainted of the image to be inpainted, and before determining the priorities of all the pixel points to be inpainted in the region to be inpainted, the method further includes:

acquiring a plurality of pixel points in the region to be inpainted;
acquiring, for each pixel point of the plurality of pixel points, neighborhood pixel points of each pixel point;
if the number of pixel points that do not belong to the region to be inpainted in the neighborhood pixel points of each pixel point is greater than a preset threshold, inpainting the pixel point according to the pixel points not belonging to the region to be inpainted; and
determining pixel point(s) that are not inpainted in the plurality of pixel points as the pixel point(s) to be inpainted.

In the embodiments, in order to reduce the influence of the number of pixel points of the hole at the edge on the inpainting speed, before determining the priority of each pixel point to be inpainted in the region to be inpainted, small holes in the region to be inpainted are remove first.

For a pixel point $p_{mask}(i, j)$ in the region to be inpainted $I_{mask}'$, the number $p_{neighbour\_8}(i, j)$ of pixel points in the eight neighborhood $p_{neighbour}(m, n)$ of the pixel point $p_{mask}(i, j)$ that do not belong to the region to be inpainted $I_{mask}'$ may be calculated by the following formula:

$$p_{neighbour\_8}(i,j) = \cup p_{neighbour}(m,n) \in I' \cap \overline{I_{mask}'}.$$

The number Nei_num of pixel points in $p_{neighbour\_8}(i, j)$ is counted. If Nei_num is greater than a preset threshold (e.g., 4), it is determined that the neighborhood of $p_{mask}(i, j)$ has enough valid pixels, and the pixel value of the $p_{mask}(i, j)$ filled with the mode of $p_{neighbour\_8}(i, j)$ is calculated as:

$$P_{mask}(i, j) = \frac{\sum_{n=1}^{Nei\_num} p_{neighbour8}(n)}{Nei\_num}.$$

For each pixel point in the plurality of pixel points, the above method is used for calculation to remove the small holes in the region to be inpainted, so as to improve the subsequent inpainting speed of the region(s) to be inpainted.

In the embodiments of the present disclosure, matching the first preset region with the regions of the reference image, and using the region in the reference image that matches the first preset region as the reference block, includes:

as shown in FIG. 7, acquiring a first reference pixel point P1 corresponding to the target pixel point P0 in the reference image 30, and acquiring a second preset region 301 of the reference image with the first reference pixel point P1 as a center;
determining a first offset matrix according to the first preset region 201 and the second preset region 301;
acquiring, for all second reference pixel points P2 in the reference image 30, third preset regions 302 of the reference image 30 each with a second reference pixel point P2 as a center;
determining a second offset matrix according to the first preset region 201 and a third preset region 302;
determining an offset factor according to the first offset matrix and the second offset matrix;
acquiring a grayscale similarity factor between the second reference pixel point and the target pixel point;
determining a similarity between the first preset region and the third preset region according to the offset factor and the grayscale similarity factor; and
among the third preset regions 302 determined according to all the second reference pixel points P2, using a preset region with the smallest similarity as the reference block 300.

For example, the first preset region, the second preset region and the third preset region may be the same in size. To reconstruct the hole region in the synthetic viewpoint using the pixel points in the reference viewpoint, it is necessary to first determine the reference block in the reference viewpoint that matches the hole region. If a first reference pixel point in the reference viewpoint corresponding to the target pixel point p(i, j) is q(m, n), an offset $\text{offset}_{pq}=(i-m, j-n)$ of the target pixel point p(i, j) relative to the first reference pixel point q(m, n) is obtained according to the target pixel point p(i, j) and the first reference pixel point q(m, n), and an offset matrix $\text{offset}_{patch_{pq}}$ (i.e., the first offset matrix) between a pixel block $p_{patch}$ (i.e., the first preset region) with the target pixel point p(i, j) as a center and a pixel block $q_{patch}$ (i.e., the second preset region) with the first reference pixel point q(m, n) as a center may be obtained.

For any pixel point q' (i.e., the second reference pixel point) in the reference viewpoint, an offset matrix $\text{offset}_{patch_{pq'}}$ (i.e., the second offset matrix) between the pixel block $p_{patch}$ and a pixel block $q_{patch}'$ (i.e., the third preset region) with the second reference pixel point q' as a center is obtained, and the offset factor $\text{offset\_patch}_{p\_qq'}$ is obtained through calculation according to the following formula:

$$\text{offset\_patch}_{p\_qq'} = \sum_{i=1}^{K+1}\sum_{j=1}^{K+1}|\text{offset}_{patch_{pq}}(i, j) - \text{offset}_{patch_{pq'}}(i, j)|.$$

Using an absolute error sum algorithm, the grayscale similarity factor $\text{gray}_{pq'}$ between the second reference pixel point q' in the reference viewpoint and the target pixel point p(i, j) in the synthetic viewpoint may be calculated using the following formula:

$$\text{gray}_{pq} = \sum_{i=1}^{K+1}\sum_{j=1}^{K+1}|p_{patch}(i,j) - q_{patch}'(i,j)|.$$

Further, the similarity between the pixel block $p_{patch}$ to be inpainted and the reference pixel block $q'_{patch}$ may be calculated using the following formula:

$$\text{Similarity}_{pq'} = w_{gray} * \text{gray}_{pq'} + w_{offset} * \text{offset\_patch}_{p_{qq'}}.$$

Where $w_{gray}$ and $w_{offset}$ are weights of the offset factor and the grayscale similarity factor respectively. The smaller the Similarity$_{pq'}$ is, the closer the pixel point q' is similar to the pixel point p. For each second reference pixel point in the reference image, the similarity between the reference block and the block to be inpainted corresponding thereto is obtained through the above calculation, and then a pixel block q'$_{patch}$ with the smallest Similarity$_{pq'}$ is used to fill the hole in the pixel block p$_{patch}$.

In the embodiments, the similarity between the third preset region that is determined according to each second reference pixel points in the reference image and the first preset region is calculated, and then the preset region with the smallest similarity is used as the reference block. As a result, it may be convenient to fill the region to be inpainted in the image to be inpainted with pixel points in the reference block subsequently, thereby improving the synthesis effect of the composite image.

Figure 4:
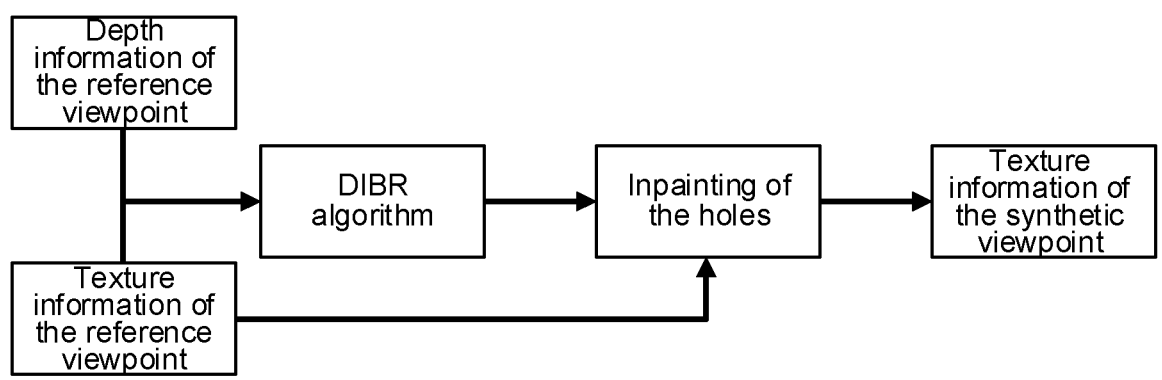
FIG. 4 is a flow diagram of another image inpainting method, in accordance with embodiments of the present disclosure.

FIG. 4 is a schematic flow diagram of the image inpainting method provided by the embodiments of the present disclosure. In FIG. 4, the image to be inpainted is acquired based on the depth information and the texture information of the reference viewpoint by using the DIBR algorithm, then the holes of the image to be inpainted are inpainted using the texture information of the reference viewpoint, and finally the texture information of the synthetic viewpoint is obtained.

The traditional image inpainting Criminisi algorithm and the inpainting method in the embodiments of the present disclosure are used to inpaint a same image respectively, and the respective inpainting results are evaluates using a peak signal to noise ratio (PSNR). The PSNR is calculated according to following formulas:

$$PSNR = 10*\log\left(\frac{255^2}{MSE}\right) = \frac{\sum_{i=1}^{Frame\_Size}(\text{Image1}_i - \text{Image2}_i)^2}{Frame\_Size}.$$

The larger the PSNR value is, the more similar the reference image and the synthetic image are. Table 1 shows the PSNR values of the above two inpainting results. It can be seen from Table 1 that, the inpainting method in the embodiments of the present disclosure has a significantly improved effect.

TABLE 1

| Method | PSNR/dB |
|---|---|
| Criminisi algorithm | 27.2 |
| The method of the present disclosure | 31.1 |

Figure 5:
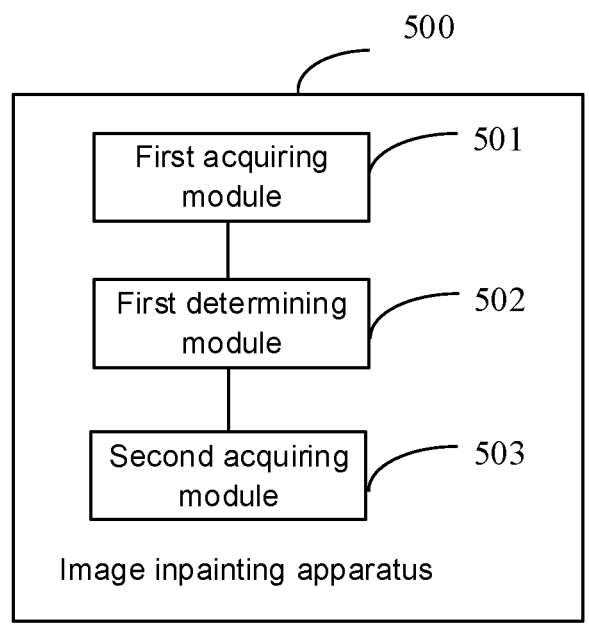
FIG. 5 is a structural diagram of an image inpainting apparatus, in accordance with embodiments of the present disclosure.

Referring to FIG. 5, FIG. 5 is a structural diagram of an image inpainting apparatus provided by embodiments of the present disclosure. As shown in FIG. 5, the image inpainting apparatus 500 includes:

a first acquisition module 501 used to acquire an image to be inpainted based on both depth information and texture information of a reference image, the image to be inpainted including region(s) to be inpainted, and the region(s) to be inpainted each including at least one pixel point to be inpainted with a pixel value of zero;

a first determining module 502 used to determine reference block(s) in the reference image that matches the region(s) to be inpainted respectively; and a second acquiring module 503 used to inpaint the region(s) to be inpainted according to the reference block(s) respectively to acquire a composite image.

In the embodiments of the present disclosure, the first determining module 502 includes:

a determining sub-module used to determine priorities of all pixel points to be inpainted in a region to be inpainted;

a first acquiring sub-module used to acquire a target pixel point with the highest priority in all the pixel points to be inpainted, and acquire a first preset region in the region to be inpainted with the target pixel point as a center; and a second acquiring sub-module used to match the first preset region with regions of the reference image, and use a region that matches the first preset region in the reference image as a reference block.

In the embodiments of the present disclosure, the second acquiring sub-module includes:

a first acquiring unit used to acquire a first reference pixel point corresponding to the target pixel point in the reference image, and acquire a second preset region of the reference image with the first reference pixel point as a center;

a first determining unit used to determine a first offset matrix according to the first preset region and the second preset region;

a second acquiring unit used to acquire, for all second reference pixel points in the reference image, third preset regions of the reference image each with a second reference pixel point as a center;

a second determining unit used to determine a second offset matrix according to the first preset region and a third preset region;

a third determining unit used to determine an offset factor according to the first offset matrix and the second offset matrix;

a third acquiring unit used to acquire a grayscale similarity factor between the second reference pixel point and the target pixel point;

a fourth determining unit used to determine a similarity between the first preset region and the third preset region according to the offset factor and the grayscale similarity factor; and a fourth acquiring unit used to use a preset region with the smallest similarity as the reference block among the third preset regions determined according to all the second reference pixel points.

In the embodiments of the present disclosure, the determining sub-module includes:

a fifth acquiring unit used to acquire, for each pixel point to be inpainted in the region to be inpainted, a structure factor of the pixel point to be inpainted according to both a unit normal vector and a gradient value of the pixel point to be inpainted;

a fifth determining unit used to determine a direction factor of the pixel point to be inpainted according to the pixel point to be inpainted and neighborhood pixel points adjacent to the pixel point to be inpainted; and a sixth determining unit used to determine a priority of the pixel point to be inpainted according to the structure factor and the direction factor.

In the embodiments of the present disclosure, after acquiring the region(s) to be inpainted of the image to be inpainted, and before determining the priorities of all the pixel points to be inpainted in the region to be inpainted, the image inpainting apparatus further includes:

a third acquiring module used to acquire a plurality of pixel points in the region to be inpainted;

a fourth acquiring module used to acquire, for each pixel point of the plurality of pixel points, neighborhood pixel points of each pixel point;

a inpainting module used to, if the number of pixel points that do not belong to the region to be inpainted in the neighborhood pixel points of each pixel point is greater than a preset threshold, inpaint the pixel point according to the pixel points not belonging to the region to be inpainted; and a second determining module used to determine pixel point(s) that are not inpainted in the plurality of pixel points as the pixel point(s) to be inpainted.

It will be noted that, the image inpainting apparatus 500 in the above embodiments may implement any implementation manner in the method embodiments shown in FIG. 1. That is, any implementation manner in the method embodiments shown in FIG. 1 may be implemented by the above-mentioned image inpainting apparatus 500 in the embodiments. The same beneficial effects may be achieved, and details will not be repeated here.

Figure 6:
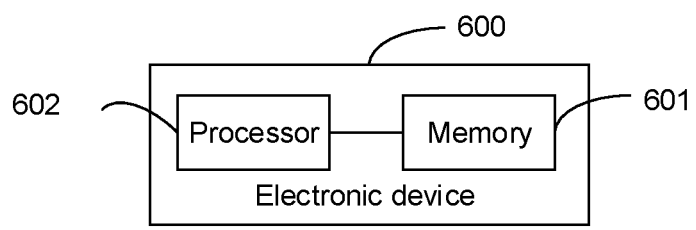
FIG. 6 is a structural diagram of an electronic device, in accordance with embodiments of the present disclosure.

Referring to FIG. 6, FIG. 6 is a structural diagram of an electronic device provided by embodiments of the present disclosure. As shown in FIG. 6, the electronic device 600 includes: a memory 601, a processor 602, and a computer program that is stored on the memory 601 and may be run on the processor 602.

The processor 602 is used to read the computer program in the memory 601, and executes the following processes:
acquiring an image to be inpainted based on depth information and texture information of a reference image, the image to be inpainted including region(s) to be inpainted, and the region(s) to be inpainted each including at least one pixel point to be inpainted with a pixel value of zero;
determining reference block(s) in the reference image that match the region(s) to be inpainted respectively; and
using the reference block(s) to inpaint the region(s) to be inpainted respectively to obtain a composite image.

Further, the processor 602 is further used to execute the following processes:
determining priorities of all pixel points to be inpainted in a region to be inpainted;
acquiring a target pixel point with the highest priority in all the pixel points to be inpainted, and acquiring a first preset region in the region to be inpainted with the target pixel point as a center; and
matching the first preset region with regions of the reference image, and using a region of the reference image that matches the first preset region as a reference block.

Further, the processor 602 is further used to execute the following processes:
acquiring a first reference pixel point corresponding to the target pixel point in the reference image, and acquiring a second preset region of the reference image with the first reference pixel point as a center;
determining a first offset matrix according to the first preset region and the second preset region;
acquiring, for all second reference pixel points in the reference image, third preset regions of the reference image each with a second reference pixel point as a center;
determining a second offset matrix according to the first preset region and each third preset region;

determining an offset factor according to the first offset matrix and the second offset matrix;
acquiring a grayscale similarity factor between the second reference pixel point and the target pixel point;
determining a similarity between the first preset region and the third preset region according to the offset factor and the grayscale similarity factor; and
among the third preset regions determined according to all the second reference pixel points, using a preset region with the smallest similarity as the reference block.

Further, the processor 602 is further used to execute the following processes:
acquiring, for each pixel point to be inpainted in the region to be inpainted, a structure factor of the pixel point to be inpainted according to a unit normal vector and a gradient value of the pixel point to be inpainted;
determining a direction factor of the pixel point to be inpainted according to the pixel point to be inpainted and neighborhood pixel points adjacent to the pixel point to be inpainted; and
determining a priority of the pixel point to be inpainted according to the structure factor and the direction factor.

Further, the processor 602 is further used to execute the following processes:
acquiring a plurality of pixel points in the region to be inpainted;
acquiring, for each pixel point of the plurality of pixel points, neighborhood pixel points of each pixel point;
if the number of pixel points that do not belong to the region to be inpainted in the neighborhood pixel points of each pixel point is greater than a preset threshold, inpainting the pixel point according to the pixel points not belonging to the region to be inpainted; and
determining the pixel point(s) that is not inpainted in the plurality of pixel points as the pixel point(s) to be inpainted.

In the embodiments of the present disclosure, the image to be inpainted is acquired based on the depth information and the texture information of the reference image, the image to be inpainted includes the region(s) to be inpainted, and the region(s) to be inpainted each includes at least one pixel point to be inpainted with a pixel value of zero. The reference block(s) matching the region(s) to be inpainted respectively in the reference image are determined. The reference block(s) are used to inpaint the region(s) to be inpainted respectively to obtain the composite image. Since the reference image has complete texture information, by filling the region to be inpainted in the image to be inpainted with the pixel points in the matched reference block found in the reference image, the synthesis effect of the composite image may be improved.

It will be noted that, the above-mentioned electronic device in the embodiments may implement any implementation manner in the method embodiments shown in FIG. 1. That is, any implementation manner in the method embodiments shown in FIG. 1 may be implemented by the above-mentioned electronic device in the embodiments. The same beneficial effects may be achieved, and details will not be repeated here.

The embodiments of the present disclosure further provide a computer-readable storage medium. The computer-readable storage medium has stored a computer program thereon, and the computer program, when executed by the processor, implements the steps in the image inpainting method (the image inpainting method shown in FIG. 1) provided by embodiments of the present disclosure.

The forgoing descriptions are implementations of the present disclosure. It will be pointed out that, a person of ordinary skill in the art may also make numerous improvements and modifications without departing from the principles of the present disclosure, and the improvements and the modifications shall also be considered within the protection scope of the present disclosure.

What is claimed is:

1. An image inpainting method, comprising:
acquiring an image to be inpainted based on both depth information and texture information of a reference image, the image to be inpainted including at least one region to be inpainted; wherein each region to be inpainted includes at least one pixel point to be inpainted with a pixel value of zero;
determining at least one reference block matching the at least one region to be inpainted respectively in the reference image; and
inpainting the at least one region to be inpainted according to the at least one reference block respectively to acquire a composite image;
wherein determining the at least one reference block matching the at least one region to be inpainted respectively in the reference image, includes:
determining priorities of all pixel points to be inpainted in a region to be inpainted;
acquiring a target pixel point with a highest priority in all the pixel points to be inpainted;
acquiring a first preset region in the region to be inpainted with the target pixel point as a center; and
matching the first preset region with regions of the reference image, and using a region of the reference image that matches the first preset region as a reference block;
wherein matching the first preset region with the regions of the reference image, and using the region of the reference image that matches the first preset region as the reference block, includes:
acquiring a first reference pixel point corresponding to the target pixel point in the reference image;
acquiring a second preset region of the reference image with the first reference pixel point as a center;
determining a first offset matrix according to the first preset region and the second preset region;
acquiring, for all second reference pixel points in the reference image, third preset regions of the reference image each with a second reference pixel point as a center; the second reference pixel point being any pixel point in the reference image;
determining a second offset matrix according to the first preset region and each third preset region;
determining an offset factor according to the first offset matrix and the second offset matrix;
acquiring a grayscale similarity factor between the second reference pixel point and the target pixel point;
determining a similarity between the first preset region and the third preset region according to the offset factor and the grayscale similarity factor; and
among the third preset regions determined according to all the second reference pixel points, using a preset region with a smallest similarity as the reference block.

2. The method according to claim 1, wherein determining the priorities of all the pixel points to be inpainted in the region to be inpainted, includes:
acquiring, for each pixel point to be inpainted in the region to be inpainted, a structure factor of the pixel point to be inpainted according to both a unit normal vector and a gradient value of the pixel point to be inpainted;
determining a direction factor of the pixel point to be inpainted according to the pixel point to be inpainted and neighborhood pixel points adjacent to the pixel point to be inpainted; and
determining a priority of the pixel point to be inpainted according to the structure factor and the direction factor.

3. The method according to claim 1, wherein after acquiring the at least one region to be inpainted of the image to be inpainted, and before determining the priorities of all the pixel points to be inpainted in the region to be inpainted, the method further comprises:
acquiring a plurality of pixel points in the region to be inpainted;
acquiring, for each pixel point of the plurality of pixel points, neighborhood pixel points of each pixel point;
if a number of pixel points not belonging to the region to be inpainted in the neighborhood pixel points of each pixel point is greater than a preset threshold, inpainting the pixel point according to the pixel points not belonging to the region to be inpainted; and
determining at least one pixel point not inpainted in the plurality of pixel points as the at least one pixel point to be inpainted.

4. A non-transitory computer-readable storage medium having stored thereon a computer program that, when executed by a processor, implements steps in the image inpainting method according to claim 1.

5. The method according to claim 1, wherein acquiring the image to be inpainted based on both the depth information and the texture information of the reference image, includes:
synthesizing the image to be inpainted, based on a depth-image-based rendering (DIBR) algorithm, according to both the depth information and the texture information of the reference image.

6. The method according to claim 1, wherein determining the priorities of all the pixel points to be inpainted in the region to be inpainted, includes:
setting priorities of a part of pixel points to be inpainted at edge positions of the region to be inpainted to be low; and
setting priorities of another part of pixel points to be inpainted at center positions of the region to be inpainted to be high.

7. The method according to claim 1, wherein the at least one region to be inpainted includes a plurality of regions to be inpainted, and the at least one reference block includes a plurality of reference blocks;
inpainting the at least one region to be inpainted according to the at least one reference block respectively to acquire the composite image, includes:
inpainting the plurality of regions to be inpainted sequentially according to the plurality of reference blocks respectively to acquire the composite image; or
inpainting the plurality of regions to be inpainted in parallel according to the plurality of reference blocks respectively to acquire the composite image.

8. An electronic device, comprising: a memory, a processor and a computer program stored on the memory and run on the processor, wherein the computer program, when executed by the processor, implements:
acquiring an image to be inpainted based on both depth information and texture information of a reference image, the image to be inpainted including at least one region to be inpainted; wherein each region to be inpainted includes at least one pixel point to be inpainted with a pixel value of zero;
determining at least one reference block matching the at least one region to be inpainted respectively in the reference image; and
inpainting the at least one region to be inpainted according to the at least one reference block respectively to acquire a composite image;
wherein the computer program, when executed by the processor, further implements;
determining priorities of all pixel points to be inpainted in a region to be inpainted;
acquiring a target pixel point with a highest priority in all the pixel points to be inpainted;
acquiring a first preset region in the region to be inpainted with the target pixel point as a center; and
matching the first preset region with regions of the reference image, and using a region of the reference image that matches the first preset region as a reference block;
wherein the computer program, when executed by the processor, further implements;
acquiring a first reference pixel point corresponding to the target pixel point in the reference image;
acquiring a second preset region of the reference image with the first reference pixel point as a center;
determining a first offset matrix according to the first preset region and the second preset region;
acquiring, for all second reference pixel points in the reference image, third preset regions of the reference image each with a second reference pixel point as a center; the second reference pixel points being any pixel point in the reference image;
determining a second offset matrix according to the first preset region and each third preset region;
determining an offset factor according to the first offset matrix and the second offset matrix;
acquiring a grayscale similarity factor between the second reference pixel point and the target pixel point;
determining a similarity between the first preset region and the third preset region according to the offset factor and the grayscale similarity factor; and
among the third preset regions determined according to all the second reference pixel points, using a preset region with a smallest similarity as the reference block.

9. The electronic device according to claim 8, wherein the computer program, when executed by the processor, further implements:
synthesizing the image to be inpainted, based on a depth-image-based rendering (DIBR) algorithm, according to both the depth information and the texture information of the reference image.

10. The electronic device according to claim 8, wherein the computer program, when executed by the processor, further implements:
acquiring, for each pixel point to be inpainted in the region to be inpainted, a structure factor of the pixel point to be inpainted according to both a unit normal vector and a gradient value of the pixel point to be inpainted;
determining a direction factor of the pixel point to be inpainted according to the pixel point to be inpainted and neighborhood pixel points adjacent to the pixel point to be inpainted; and
determining a priority of the pixel point to be inpainted according to the structure factor and the direction factor.

11. The electronic device according to claim 8, wherein the computer program, when executed by the processor, further implements:
setting priorities of a part of pixel points to be inpainted at edge positions of the region to be inpainted to be low; and
setting priorities of another part of pixel points to be inpainted at center positions of the region to be inpainted to be high.

12. The electronic device according to claim 8, wherein after acquiring the at least one region to be inpainted of the image to be inpainted, and before determining the priorities of all the pixel points to be inpainted in the region to be inpainted, the computer program, when executed by the processor, further implements:
acquiring a plurality of pixel points in the region to be inpainted;
acquiring, for each pixel point of the plurality of pixel points, neighborhood pixel points of each pixel point;
if a number of pixel points not belonging to the region to be inpainted in the neighborhood pixel points of each pixel point is greater than a preset threshold, inpainting the pixel point according to the pixel points not belonging to the region to be inpainted; and
determining at least one pixel point not inpainted in the plurality of pixel points as the at least one pixel point to be inpainted.

13. The electronic device according to claim 8, wherein the at least one region to be inpainted includes a plurality of regions to be inpainted, and the at least one reference block includes a plurality of reference blocks; the computer program, when executed by the processor, further implements:
inpainting the plurality of regions to be inpainted sequentially according to the plurality of reference blocks respectively to acquire the composite image; or
inpainting the plurality of regions to be inpainted in parallel according to the plurality of reference blocks respectively to acquire the composite image.

* * * * *